United States Patent
Munguia

(10) Patent No.: US 7,606,960 B2
(45) Date of Patent: *Oct. 20, 2009

(54) APPARATUS FOR ADJUSTING A CLOCK FREQUENCY OF A VARIABLE SPEED BUS

(75) Inventor: Peter R. Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/810,026

(22) Filed: Mar. 26, 2004

(65) Prior Publication Data

US 2005/0216643 A1 Sep. 29, 2005

(51) Int. Cl.
G06F 13/40 (2006.01)
G08B 25/00 (2006.01)
G06F 15/173 (2006.01)
G06F 5/00 (2006.01)
G06F 13/20 (2006.01)
G06F 13/36 (2006.01)

(52) U.S. Cl. .............. 710/307; 340/825; 709/233; 710/60; 710/306; 710/313; 712/32

(58) Field of Classification Search .............. 710/33, 710/300, 307, 58, 240, 309, 15, 60, 313, 710/306; 713/600, 501, 320, 322; 340/825; 370/257; 709/233; 322/32; 361/683–686; 712/32

See application file for complete search history.

(56) References Cited

U.S. PATENT DOCUMENTS

| | | | | |
|---|---|---|---|---|
| 5,237,676 A | * | 8/1993 | Arimilli et al. ............ 710/110 |
| 5,509,126 A | * | 4/1996 | Oprescu et al. ............ 710/307 |
| 5,546,567 A | * | 8/1996 | Nakamura ................. 713/501 |
| 5,559,967 A | | 9/1996 | Oprescu et al. |
| 5,581,729 A | * | 12/1996 | Nishtala et al. ............ 711/143 |
| 5,625,826 A | * | 4/1997 | Atkinson ................... 713/322 |
| 5,627,744 A | * | 5/1997 | Baker et al. ................ 363/165 |
| 5,628,019 A | | 5/1997 | O'Brien |
| 5,630,163 A | | 5/1997 | Fung et al. |
| 5,666,422 A | * | 9/1997 | Harrison et al. ............. 381/18 |
| 5,809,291 A | * | 9/1998 | Munoz-Bustamante et al. ........................ 713/501 |
| 5,815,734 A | * | 9/1998 | Lee et al. .................... 710/60 |
| 5,825,854 A | | 10/1998 | Larson et al. |
| 5,844,794 A | * | 12/1998 | Keeley ......................... 700/9 |

(Continued)

OTHER PUBLICATIONS

"PWM inverters and their influence on motor overvoltage" by Kerkman et al. (abstract only) Publication Date: Feb. 23-27, 1997.*

(Continued)

Primary Examiner—Mark Rinehart
Assistant Examiner—Christopher A Daley
(74) Attorney, Agent, or Firm—Blakely, Sokoloff, Taylor & Zafman LLP

(57) ABSTRACT

An embodiment involves throttling a bus frequency based upon incoming arbitration requests from units or devices coupled to a bus. Arbitration circuitry monitors request rates from each requestor and increases or decreases the bus frequency in order to meet the bandwidth levels requested. When the bandwidth requirements increase, the bus frequency increases. When the bandwidth requirements are reduced, the bus frequency is reduced to reduce power consumption. No software intervention is required to adjust the bus bandwidth.

21 Claims, 2 Drawing Sheets

U.S. PATENT DOCUMENTS

| | | | |
|---|---|---|---|
| 5,949,891 | A | 9/1999 | Wagner et al. |
| 5,978,869 | A * | 11/1999 | Guthrie et al. ............... 710/60 |
| 6,006,303 | A * | 12/1999 | Barnaby et al. ............. 710/244 |
| 6,073,244 | A * | 6/2000 | Iwazaki ...................... 713/322 |
| 6,079,022 | A * | 6/2000 | Young ......................... 713/300 |
| 6,134,621 | A * | 10/2000 | Kelley et al. ................ 710/311 |
| 6,185,692 | B1 * | 2/2001 | Wolford ..................... 713/501 |
| 8,185,892 | | 2/2001 | Watford el al. |
| 6,304,645 | B1 | 10/2001 | Holland et al. |
| 6,404,883 | B1 | 6/2002 | Hartmeier |
| 6,418,201 | B1 | 7/2002 | Holland et al. |
| 6,484,222 | B1 * | 11/2002 | Olson et al. ................. 710/300 |
| 6,510,473 | B1 * | 1/2003 | Voit ............................ 710/58 |
| 6,556,672 | B1 | 4/2003 | Holland et al. |
| 6,564,329 | B1 * | 5/2003 | Cheung et al. .............. 713/322 |
| 6,611,893 | B1 * | 8/2003 | Lee et al. .................... 710/309 |
| 6,642,942 | B1 | 11/2003 | Crook |
| 6,741,791 | B1 | 5/2004 | Wymore et al. |
| 6,792,102 | B2 | 9/2004 | Shires |
| 6,820,209 | B1 * | 11/2004 | Culbert et al. ............. 713/501 |
| 6,853,720 | B2 | 2/2005 | Ramachandran |
| 6,920,216 | B2 | 7/2005 | Finnie et al. |
| 7,281,148 | B2 * | 10/2007 | Munguia, Peter R. ....... 713/322 |
| 7,370,221 | B2 * | 5/2008 | Tang et al. .................. 713/501 |
| 2002/0083241 | A1 | 6/2002 | Moller |
| 2003/0149826 | A1 * | 8/2003 | Kadota ........................ 710/306 |
| 2004/0017234 | A1 * | 1/2004 | Tam et al. .................... 327/141 |
| 2005/0044442 | A1 * | 2/2005 | Barr et al. .................... 713/600 |
| 2007/0271405 | A1 * | 11/2007 | Moore ......................... 710/309 |

OTHER PUBLICATIONS

"A bus on a diet-the serial bus alternative-an introduction to the P1394 High Performance Serial Bus" by M. Teener (abstract only) Publication Date:24-28 Feb. 1992.*

Jisuhn Suh et al, Arbitration Latency Analysis of the Shared Channel Architecture for High Performance Multi-Master SoC, Aug. 4, 2004.*

PCT Search Report and Written Opinion, PCT/US2005/008998, Int'l Filing Date Mar. 18, 2005, mailed Jan. 25, 2006, (11 pages).

USPTO Office Action dated Dec. 6, 2006 in corresponding U.S. Appl. No. 10/809,970, filed Mar. 26. 2004 to P. Mungula.

"42P18957SG Written Opinion Mailed for SG Patent Application SG200605365-6", (Nov. 9, 2007), Whole Document.

* cited by examiner

APPARATUS FOR ADJUSTING A CLOCK FREQUENCY OF A VARIABLE SPEED BUS

FIELD OF THE INVENTION

The present invention pertains to the field of computer systems. More particularly, this invention pertains to the field of power management of devices within computer systems.

BACKGROUND OF THE INVENTION

In many semiconductor devices such as embedded processors, systems-on-a-chip (SOC), or other computer systems or consumer electronic devices, on-chip busses are becoming faster and wider with many associated register queues and related logic in attached unit interfaces. Split transaction capabilities on these busses have added significant depth to these queues. This is leading to a situation where on-chip busses and their associated interfaces will become a significant portion of overall system power, particularly in SOC designs.

Previous efforts to reduce power consumption on busses and their associated attached units have included powering down individual units when they are not in use and reducing bus frequencies. In embedded processors and SOC designs, there may be large variances in work loads depending on the applications currently executing, time of day, type of traffic, etc. The variations in workload are often under the control of various independent software drivers. These drivers typically control their particular units but do not control system resources such as busses.

In prior systems, in order to control system resources such as busses, additional communication with software that manages system resources is typically used. The overhead and latency involved with using software to power manage system resources such as busses can be significant. This latency reduces the value of power managing system resources such as busses that need to be able to quickly change speeds based on current workload.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, one embodiment of the invention involves throttling a bus frequency based upon incoming arbitration requests from units or devices coupled to the bus. Arbitration circuitry monitors request rates from each requestor and increases or decreases the bus frequency in order to meet the bandwidth levels requested. When the bandwidth requirements increase, the bus frequency increases. When the bandwidth requirements are reduced, the bus frequency is reduced, thereby reducing power consumption.

The embodiments described herein may be implemented such that there is no software intervention required to adjust the bus bandwidth once initially configured. Software can be used to control power consumption of individual units or devices attached to the bus. In the described embodiments, the bus frequency is independently adjusted based on request rates, the requesting device characteristics, and bandwidth requirements.

Figure 1:
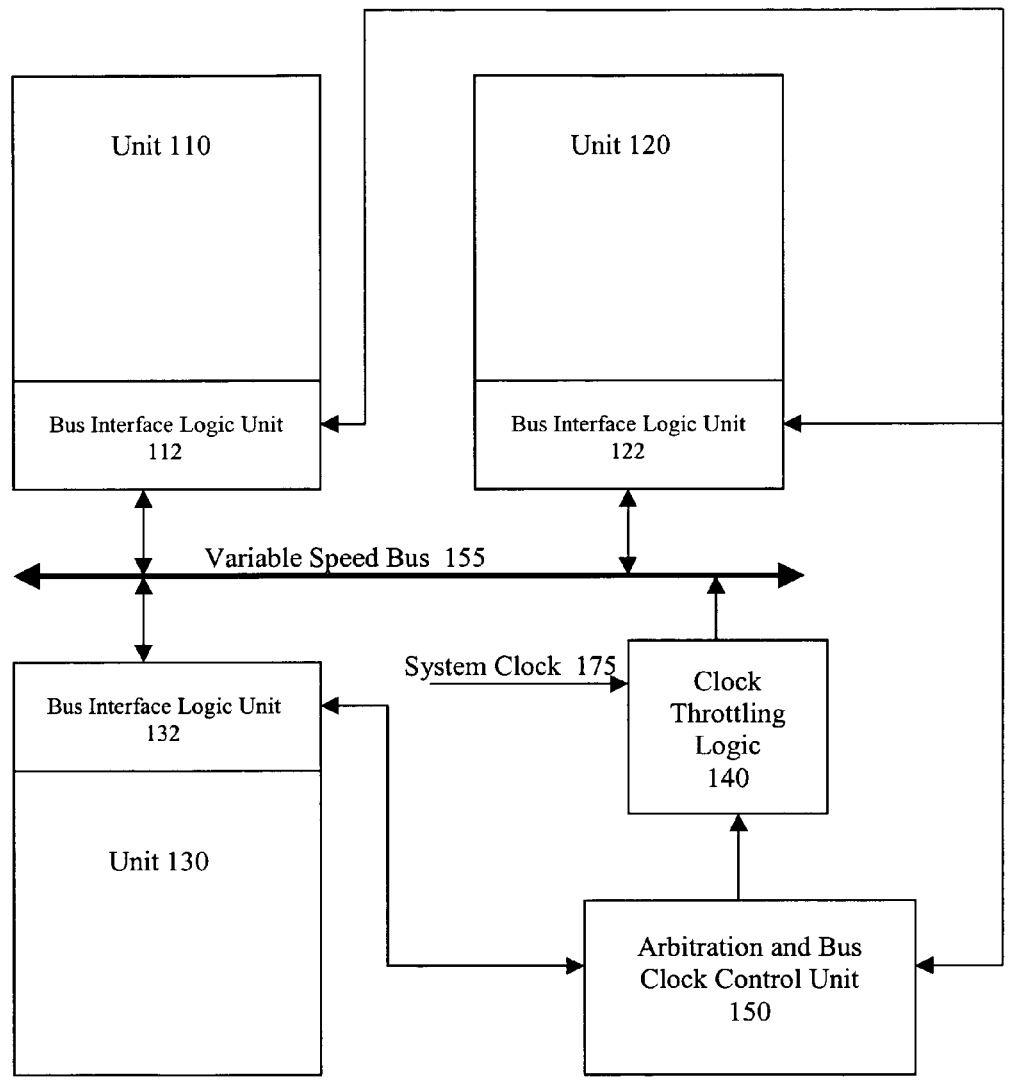
FIG. 1 is a block diagram of one embodiment of a system including several functional units coupled to a variable speed bus and an arbitration and bus clock control unit.

FIG. 1 is a block diagram of a system 100 including units 110, 120, and 130 coupled to a variable speed bus 155. The frequency of the variable speed bus 155 is controlled by an arbitration and bus clock control unit 150 via a clock throttling logic unit 140.

Each of the units 110, 120, and 130 are coupled to the bus 155 via bus interface logic units 112, 122, and 132, respectively. The bus interface logic units 112, 122, and 132 are further coupled to the arbitration and bus clock control unit 150. Whenever one of the units 110, 120, and 130 desires to access the bus 155, a request is made to the arbitration and bus clock control unit 150. The arbitration and bus clock control unit 150 not only performs typical arbitration functions, but also tracks how often each of the units 110, 120, and 130 requests access to the bus 155. The arbitration and bus clock control unit 150 instructs the clock throttling logic 140 to adjust the frequency of the bus 155 according to the bandwidth requirements of the units 110, 120, and 130 based on the request rates of the units 110, 120, and 130. The clock throttling logic 140 derives the clock for the bus 155 from a system clock 175.

The units 110, 120, and 130 may be any of a wide variety of functional units, including, but not limited to, host processor units, video processor units, hard disk drive controller units, IEEE (Institute of Electrical and Electronic Engineers, Inc.) 1394 controller units, Peripheral Component Interconnect (PCI) bridge units, management processor units, and input/output controller units for slower peripheral devices.

Although system 100 is shown with only three functional units coupled to the bus 155, other embodiments are possible with a wide range of possible numbers of units coupled to the bus. Further, although system 100 is shown to be implemented on a single integrated circuit die, other embodiments are possible where the bus 155 is used to couple together discrete devices.

An example of some of the possible functions of system 100 will now be described. For this example, the bus 155 achieves a throughput of 100 MB/s for every 10 MHz of clock speed. The system 100 is initialized with the bus 155 at full speed, which for this example is 100 MHz which corresponds to 1 GB/s peak bandwidth on the bus 155. Also, for this example, the unit 110 is a host processor, unit 120 is a video processor, and unit 130 is an IEEE 1394 controller.

After initialization, the arbitration and bus clock control unit 150 recognizes that there are no incoming requests from the IEEE 1394 controller, and that less than 70% of the arbitration slots are utilized. The arbitration and bus clock control unit 150 will then direct the clock throttling unit 140 to throttle the bus clock frequency down to 70 MHz. The recognition interval is implementation dependent and may be based upon a reasonably finite number of sequential arbitration slots. For this example, the recognition interval is 128 arbitration slots. Each arbitration slot for this example may consist of 200 bytes, which for this example would provide 500 k arbitration slots per second.

For the current example, assume that at some later time the arbitration and bus clock control unit 150 recognizes that the host processor unit 110 is only sustaining 10% of the arbitration slots and that the video processor 120 is using 43% of all slots. The units 110 and 120 together are using 53% of the arbitration slots with the bus running at 70 MHz. The arbitration and bus clock control unit 150 then directs the clock throttling unit 140 to reduce the bus clock frequency to 40 MHz, staying just ahead of the bandwidth requirements.

The arbitration and bus clock control unit 150 can use average utilization over time or use other statistical methods to determine sustained bandwidth needs. The recognition interval may be short enough (perhaps 1–10 us) to handle short bursts of activity such as that from a hard disk drive controller.

Additionally, the arbitration and bus clock control unit 150 may recognize a request from an isochronous data transfer controller, such as the IEEE 1394 controller 130. In this case, the arbitration and bus clock control unit 150 bumps up the bus clock frequency to ensure that there is adequate bandwidth to satisfy the isochronous data transfer. The arbitration and bus clock control unit 150 will also cause the bus clock frequency to be reduced if the isochronous data transfer unit returns to an idle state.

If the system 100 is put into an idle state, where perhaps only a management processor is active and minor peripheral traffic and host processor traffic are ongoing, the bus frequency can be reduced to a minimal level (perhaps 20 MHz).

The previous example described the system 100 as having the bus 155 starting out at a maximum clock frequency upon system initialization. Other embodiments are possible where the variable speed bus 155 is set at other frequencies upon system initialization. For example, in one embodiment the bus frequency is set at a frequency sufficient to only service access to a boot ROM (perhaps 2 MHz). As other units become active the arbitration and bus clock control unit 150 can increase the bus frequency to accommodate the increased bandwidth needs.

Figure 2:
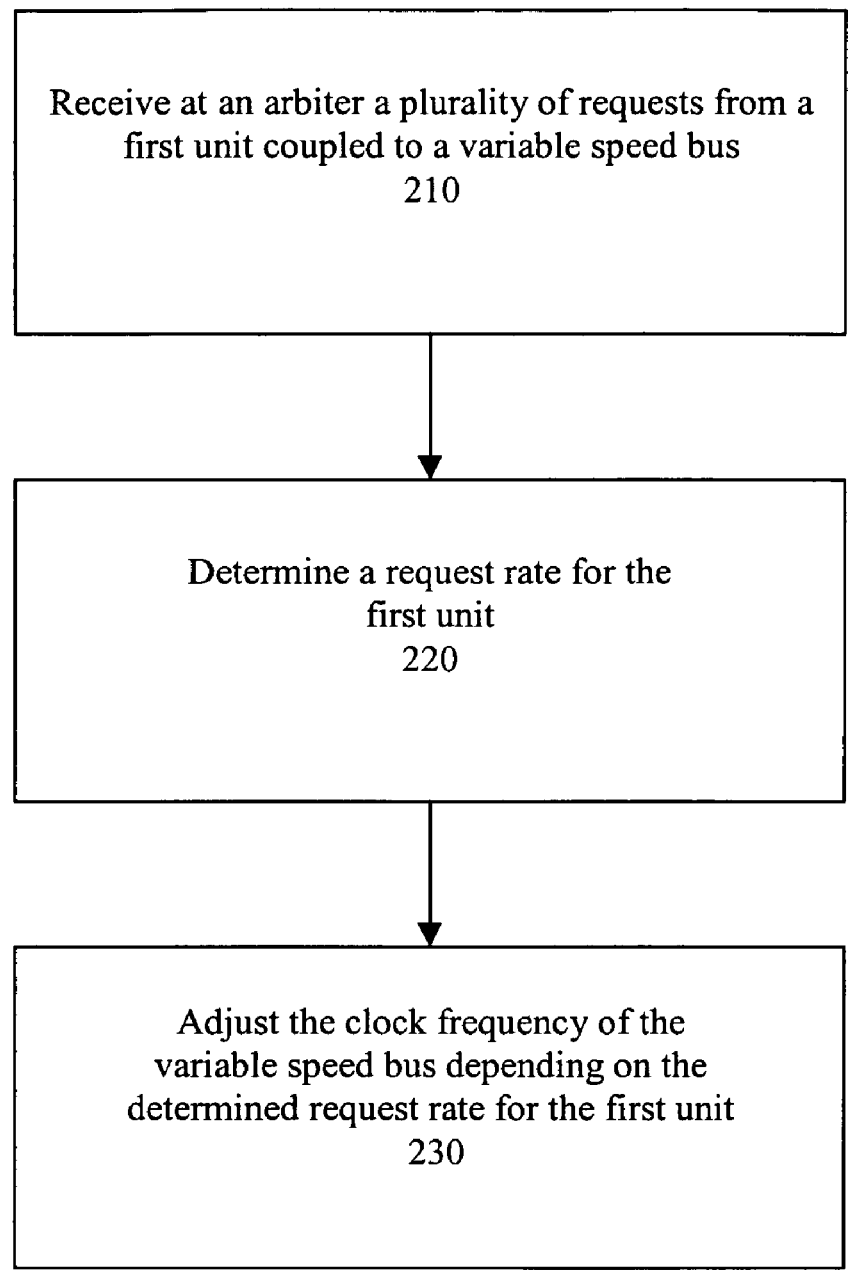
FIG. 2 is a flow diagram of one embodiment of a method for power managing a variable speed bus.

FIG. 2 is a flow diagram of one embodiment of a method for power managing a variable speed bus. At block 210, a number of requests are received at an arbiter from a unit coupled to a variable speed bus. Then, at step 220, a request rate is determined for the unit coupled to the variable speed bus. The clock frequency of the variable speed bus is adjusted at block 230 depending on the determined request rate. In this manner, the variable speed bus is operated at a frequency sufficient to adequately service the requesting unit, but without wasting power by operating the bus at a frequency higher than needed. The embodiment described in connection with FIG. 2 may be expanded to include a number of units or devices coupled to the variable speed bus where the arbiter tracks request rates for each of the units or devices.

As seen in the discussion above, the embodiments described provide improved energy efficiency and reduce overall power requirements potentially saving other system costs associated with heat (fans, heat sinks, etc.).

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus comprising:
   a variable speed bus, the variable speed bus initialized with a first clock frequency;
   a first unit coupled to the variable speed bus, the first unit having a first rate of requests to access the variable speed bus;
   a second unit coupled to the variable speed bus, the second unit having a second rate of requests to access the variable speed bus; and
   an arbitration and bus clock control unit to monitor the first access request rate from the first unit and the second access request from the second unit, and to determine a second clock frequency for the variable speed bus based on the first access rate or the second access request rate, the arbitration and bus clock control unit being modified to track a rate of request of the first and second units to access the variable speed bus, the arbitration and bus clock control unit being further modified to recognize when there are no incoming requests and a percentage of arbitration slots that are being used, and to instruct a clock throttling logic to adjust a clock frequency associated with the variable speed bus according to bandwidth requirements of the first and second units based on the rate of request, wherein the adjusting of the clock frequency includes lowering the clock frequency to a lowest level necessary in accordance with the recognition of no incoming requests and the percentage of the arbitration slots being used and further in accordance with a historical average utilization including statistical data relating to sustained bandwidth needs such that the clock frequency of the variable speed bus is automatically adjusted depending on one or more of the rate of request, the percentage of arbitration slots being used, and the historical average utilization relating to the first and second units.

2. The apparatus of claim 1, wherein the first unit comprises a processor unit.

3. The apparatus of claim 1, wherein the second unit comprises a video processor unit.

4. The apparatus of claim 1, wherein the first unit comprises a hard disk drive controller unit.

5. The apparatus of claim 1, wherein the second unit comprises an isochronous data transfer unit.

6. The apparatus of claim 5, wherein the isochronous data transfer unit comprises a 1394 controller unit.

7. The apparatus of claim 5, wherein the isochronous data transfer unit comprises a USB controller unit.

8. The method of claim 1, wherein the first unit comprises a processor unit.

9. The method of claim 1, wherein the second unit comprises a video processor unit.

10. The method of claim 1, wherein the first unit comprises a hard disk drive controller unit.

11. The method of claim 1, wherein the second unit comprises an isochronous data transfer unit.

12. A system, comprising:
    a device coupled to a variable speed bus, the device having a rate of request to access the variable speed bus; and
    an arbitration and bus clock control unit to monitor the rate of request, and to determine a clock frequency associated with the variable speed bus based on the rate of request, the arbitration and bus clock control unit being modified to track the rate of request to access the variable speed bus, the arbitration and bus clock control unit being further modified to recognize when there are no incoming requests and a percentage of arbitration slots that are being used, and to instruct a clock throttling logic to adjust the clock frequency associated with the variable speed bus based on the rate of request to access the variable speed bus from the device, wherein the adjusting of the clock frequency includes lowering the clock frequency to a lowest level necessary in accordance with the recognition of no incoming requests and the percentage of the arbitration slots being used and further in accordance with a historical average utilization including statistical data relating to sustained bandwidth needs such that the clock frequency of the variable speed bus is automatically adjusted depending on one or more of the rate of request, the percentage of arbitration slots being used, and the historical average utilization relating to the first and second units.

13. The system of claim 12, wherein the device coupled to the variable speed bus comprises a processor.

14. The system of claim 12, wherein the device coupled to the variable speed bus comprises a video processor.

15. The system of claim 12, wherein the device coupled to the variable speed bus comprises a hard disk drive controller.

16. The system of claim 12, wherein the device coupled to the variable speed bus comprises an isochronous data transfer controller.

17. The system of claim 16, wherein the isochronous data transfer controller comprises a 1394 controller.

18. The system of claim 16, wherein the isochronous data transfer controller comprises a USB controller.

19. The system of claim 12, wherein the arbitration and bus clock control unit determines the second clock frequency based on a first bandwidth requirement from the first unit and a second bandwidth requirement from the second unit, the first bandwidth requirement derived from the first rate of request to access the variable speed bus from the first unit, the second bandwidth requirement derived from the second rate of request to access the variable speed bus from the second unit.

20. The system of claim 12, wherein the variable speed bus, the first unit, the second unit, the clock throttling logic and the arbitration and clock control unit are located on a single semiconductor die.

21. A method comprising:
  accessing the variable speed bus by the first unit having a first rate of requests, the first unit coupled to the variable speed bus;
  accessing the variable speed bus by the second unit having a second rate of requests, the second unit coupled to the variable speed bus; and
  monitoring, by an arbitration and bus clock control unit, the first access request rate from the first unit and the second access request from the second unit, and to determine a second clock frequency for the variable speed bus based on the first access rate or the second access request rate, the arbitration and bus clock control unit being modified to track a rate of request of the first and second units to access the variable speed bus, the arbitration and bus clock control unit being further modified to recognize when there are no incoming requests and a percentage of arbitration slots that are being used, and to instruct a clock throttling logic to adjust a clock frequency associated with the variable speed bus according to bandwidth requirements of the first and second units based on the rate of request, wherein the adjusting of the clock frequency includes lowering the clock frequency to a lowest level necessary in accordance with the recognition of no incoming requests and the percentage of the arbitration slots being used and further in accordance with a historical average utilization including statistical data relating to sustained bandwidth needs such that the clock frequency of the variable speed bus is automatically adjusted depending on one or more of the rate of request, the percentage of arbitration slots being used, and the historical average utilization relating to the first and second units.

\* \* \* \* \*

UNITED STATES PATENT AND TRADEMARK OFFICE
CERTIFICATE OF CORRECTION

PATENT NO.        : 7,606,960 B2                                                  Page 1 of 1
APPLICATION NO. : 10/810026
DATED             : October 20, 2009
INVENTOR(S)       : Munguia et al.

It is certified that error appears in the above-identified patent and that said Letters Patent is hereby corrected as shown below:

In column 6, at line 5, after, "comprising:" insert --initializing a variable speed bus with a first clock frequency--.

Signed and Sealed this

Fifth Day of October, 2010

David J. Kappos
*Director of the United States Patent and Trademark Office*